Nov. 16, 1965   G. A. DOTTO ETAL   3,217,841
DISC BRAKE AND ACTUATING MEANS THEREFOR
Filed April 5, 1962   3 Sheets-Sheet 1
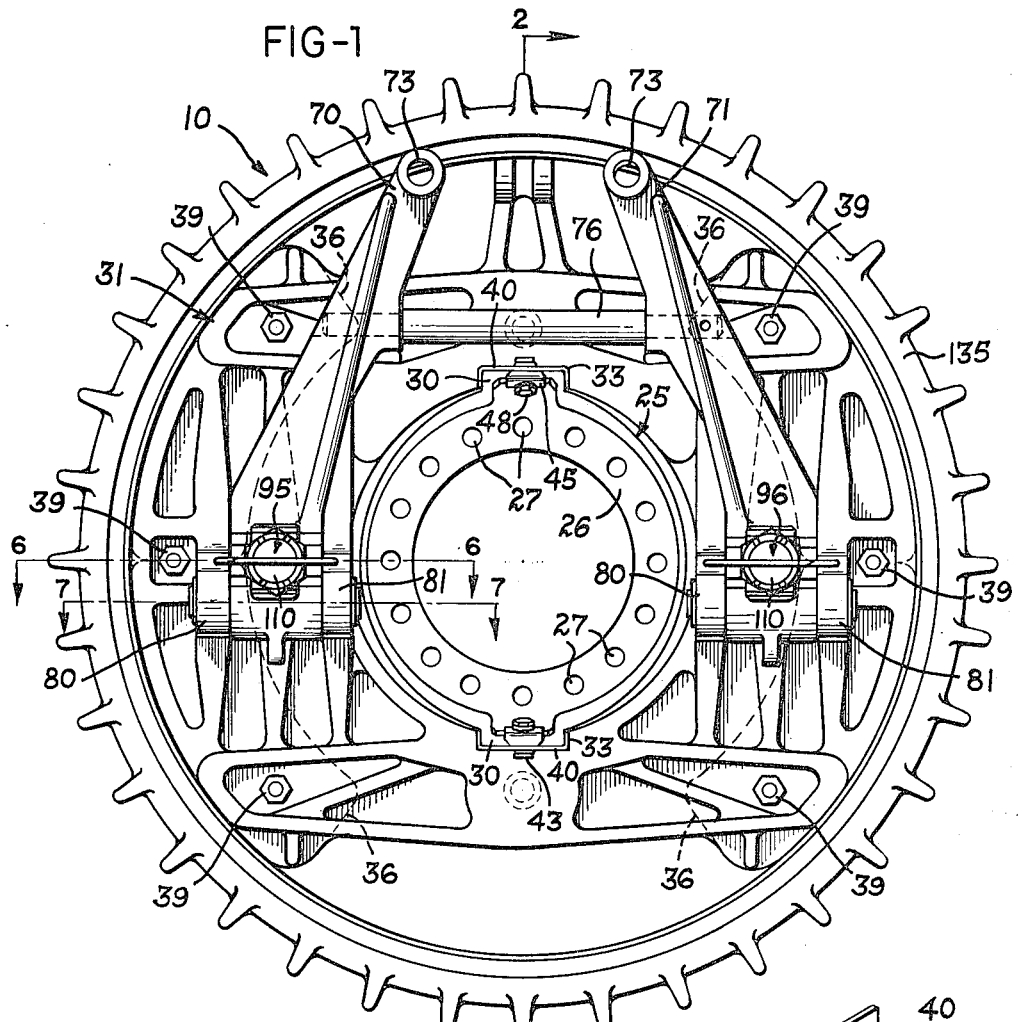
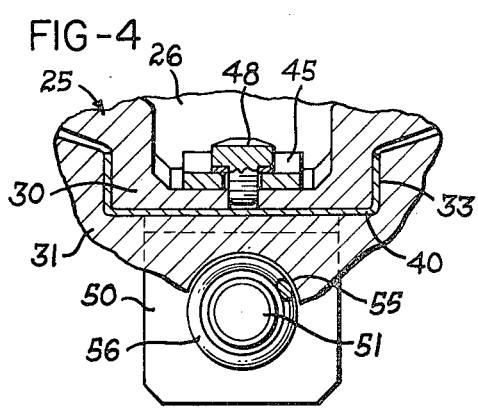
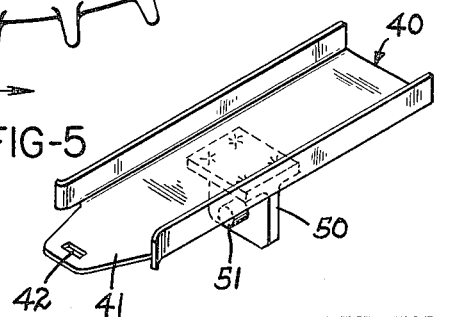
INVENTORS
GIANNI A. DOTTO &
BY WILLIAM D. WALTHER
Marechal, Biebel, French & Bugg
ATTORNEYS

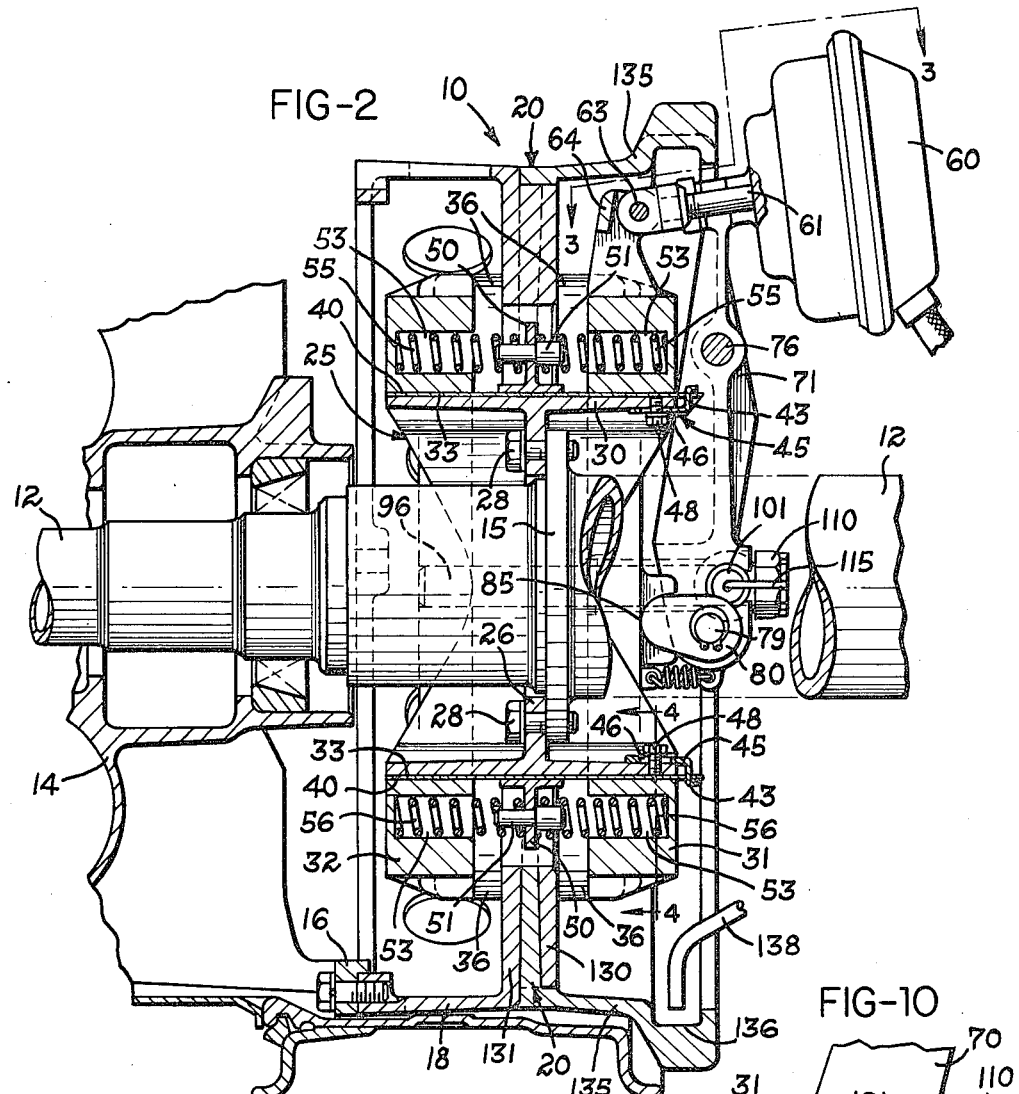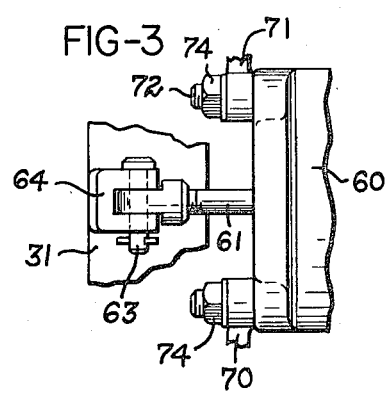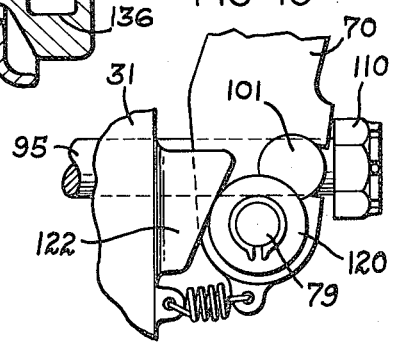
INVENTORS
GIANNI A. DOTTO &
BY WILLIAM D. WALTHER
Marechal, Biebel, French & Bugg
ATTORNEYS

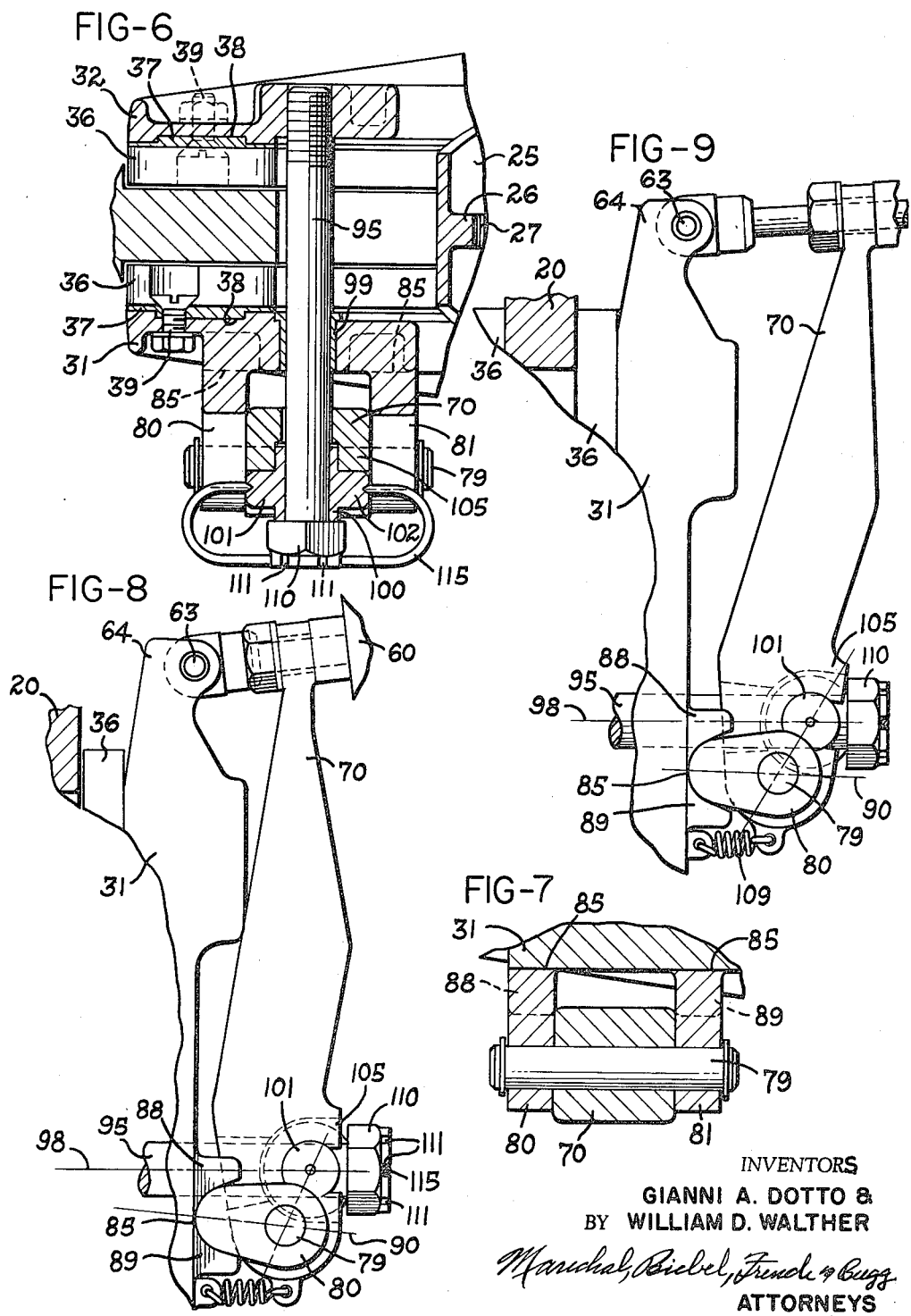

United States Patent Office 3,217,841
Patented Nov. 16, 1965

3,217,841
DISC BRAKE AND ACTUATING MEANS THEREFOR
Gianni A. Dotto and William D. Walther, Dayton, Ohio, assignors to The Dayton Steel Foundry Company, Dayton, Ohio, a corporation of Ohio
Filed Apr. 5, 1962, Ser. No. 185,333
13 Claims. (Cl. 188—72)

This invention relates to brakes and more particularly to a disk brake for heavy loads providing high and consistent, controllable stopping torques.

The brake of this invention is characterized by its ruggedness, light weight, and simplicity of parts and construction, and provides consistent and high stopping torque without self-energizing characteristics and with a minimum of actuator displacement.

An important object of this invention is the provision of a disk brake assembly which can be easily assembled and removed from a fixed axle of a heavy duty vehicle, such as that of a trailer truck. This is accomplished in this invention by the provision of a torque member which is positioned within the disk and which supports a pair of friction plates, consisting of inner and outer pressure plates for movement into frictional engagement with the disk. The disk and plates are removable as a unit without the necessity of removing the torque member.

A further object of this invention is the provision of a disk brake having a simplified operating mechanism which produces equal forces on each of two pressure plates to move these plates on a central torque member into engagement with the opposite surfaces of a disk, free of binding forces tending to interfere with the movement of the pressure plates.

A further object of this invention is the provision of a disk brake including an inner and an outer pressure plate mounted on a central torque member for axial movement into braking engagement with a disk including mechanism for positioning the operating centers of the plates with respect to the rotational plane of the disk for uniform braking forces on each side of the disk.

Another object of this invention is the provision of a disk brake actuator arm arrangement wherein draw bolts are employed for operating one of a pair of opposite pressure plates, and the other pressure plate being operated through a variable pivotal connection moved during actuation to decrease the stroke required by the actuator.

Another object is the provision of a brake disk having a water-retaining recess for cooling by vaporization with steam.

A further object of the invention is the provision of a disk brake which includes a pair of actuator arms pivotally mounted on one of a pair of pressure plates and including draw bolts extending through this pressure plate and connected to the opposite pressure plate, wherein the pair of arms are free to move in a limited sense one to the other to compensate for differences in adjustment of one of the draw bolts relative to the other.

Other objects and advantages of the invention will be apparent from the following description, the accompanying drawings and the appended claims.

In the drawings:

FIG. 1 is an inner end view, with the actuator removed, of a brake constructed according to this invention;

FIG. 2 is a transverse vertical section taken generally along the line 2—2 of FIG. 1, showing the brake assembled on a wheel and axle assembly;

FIG. 3 is a fragmentary plan view looking generally along the line 3—3 of FIG. 2 showing the connection of the actuator to the actuator arms;

FIG. 4 is a fragmentary enlarged section through a portion of the torque member and the inner pressure plate taken generally along the line 4—4 of FIG. 2;

FIG. 5 is a perspective view of the combined sleeve bearing and retraction spring positioning member;

FIG. 6 is a horizontal section showing the connection of one of the draw bolts to a pressure plate and an actuator arm, taken generally along the line 6—6 of FIG. 1;

FIG. 7 is a section taken generally along the line 7—7 of FIG. 1;

FIGS. 8 and 9 are enlarged somewhat diagrammatic details of a portion of FIG. 2 showing one of the actuator arms respectively in the released and actuated positions; and FIG. 10 is a fragmentary elevation of a modified actuator arm arrangement.

Referring to the drawings, which illustrate a preferred embodiment of this invention, a disk brake constructed according to the teachings of this invention is illustrated at 10 in FIGS. 1 and 2. In FIG. 2, the brake 10 is shown assembled to a wheel and axle assembly which includes a fixed or non-rotating axle 12 supporting a wheel 14 for rotation thereon at one end thereof. The axle 12 is flanged at 15 adjacent the wheel 14 to support the non-rotating components of the brake.

The wheel 14 is flanged at 16 to join and support the inwardly extending peripheral supporting flange 18 of an annular disk 20. The disk 20 is preferably constructed according to the teachings of U.S. Patent No. 3,013,636 of Gianni A. Dotto and William D. Walther, issued December 19, 1961, and assigned to the same assignee as this application. The disk 20 is directly supported on the wheel 14 for rotation therewith and is held against axial movement by the wheel. The peripheral outer supporting flange 18 of the disk 20 extends axially at the outer peripheral extent of the disk, leaving the interior of the disk open to receive the non-rotating brake members.

The torque member 25, or spider as it is sometimes called, is positioned within and generally centrally of the disk 20. The torque member 25 includes an inwardly depending annular flange 26 which is drilled at 27 to accept mounting bolts 28 which extend into the flange 15 of the axle 12 to secure the torque member in a mounted position on the axle 12.

Spline means consisting of a pair of opposite axially extending keys or webs 30 are formed on the torque member 25. Each key 30 extends the length of the torque member 25, as shown in section in FIG. 2 and in enlarged detail in FIG. 4. The peripheral portion of the torque member 25 extending between the keys or webs 30 is ground to an ellipse to avoid interference when assembling or removing the pressure plates and torque arms.

A pair of pressure plates consist of an inner plate 31 and an outer plate 32, each of which is slidably mounted on the torque member 25, and each of which is formed with a keyway or a slot 33, as shown in FIGS. 1 and 4, proportioned to receive the keys 30 of the torque member therein. The pressure plates 31 and 32 are therefore mounted for unrestricted axial movement on the torque member 25 but are held against rotational movement by their splined connection thereto.

The pressure plates are each substantially the same in construction, with the principal difference being that the inner plate 31 is adapted to support brake operating arms and the outer plate is threaded to receive draw bolts. Each of the plates removably carries four pads 36 of friction material which move with the pressure plates into frictional engagement with the opposite sides of the disk 20 upon the application of braking pressure. The pads 36 are carried in opposite pairs on the inside faces of the plates with one of each of the pairs being positioned above the center line of the axle and the other being equally positioned below the center line, for the uniform distribution of braking force to the disk, as shown by the broken lines in FIG. 1. The pads 36 have backing plates 37 (FIG. 6) which are keyed at 38 for rapid insertion and removal from cooperating slots formed in the plates. Bolts 39 retain the pads 36 locked in position.

Combined sleeve bearing means and retraction spring positioning means are interposed between the keys 30 on the torque member 25 and the cooperating slots 33 in the pressure plates and consist of a pair of generally channel shaped bronze plated sleeves 40, as shown in FIGS. 4 and 5. The sleeves 40 are proportioned to be received over the outer surface of the keys 30 of the torque member 25. Each sleeve has an outwardly extending tongue portion 41 which is slotted at 42 to receive the tab 43 of an anchoring clip 45, as shown in FIG. 2 and in section in FIG. 4. The clip 45 is slotted at 46 to provide limited axial movement thereof under the securing bolt 48. The outer surface of the sleeve 40 therefore forms a bearing means providing for the axial braking and retracting movement of the pressure plates on the torque member.

Spring positioning means includes an upright 50 which is spot welded to the outer surface of each of the sleeves 40 and which supports a spring locating pin 51 extending axially therethrough. Each of the pressure plates 31 and 32 is recessed as indicated at 53 in FIG. 2 to receive upper and lower retraction springs 55 and 56 therein. The exposed end of each of the retraction springs is received over the locating pin 51 in abutment with the adjacent surface of the upright 50. Thus, the invention includes separate and independent retraction means for each of the pressure plates extending oppositely from the spring positioning upright 50 and into engagement with the opposite plates.

An important feature of this invention resides in the ease by which the brake can be mounted onto the axle of a vehicle, and the ease and accuracy by which the operating center of the pressure plates may be correlated with the running plane of the disk 20. The running position of the disk is affected by such factors as tolerance stack up, wear on the axle and bearings, bearing placement, and the like. A slight amount of misalignment between shoes and drum on a drum brake is not critical since the braking movement is radial. However, the efficient operation of a disk brake depends upon the equality of forces exerted on the opposite sides of the disk, and misalignment of the pressure plates in relation to the disk would cause the pads of one of the pressure plates to come into contact with the disk ahead of the pads on the other pressure plate.

Accordingly, this invention provides brake retraction spring positioning means, including the upright 50 and the adjustable mounting thereof, by means of which the operation of the pressure plates can be made uniform in relation to the operating center of the disk 20. This is effectively and easily accomplished by loosening the bolts 48 and by clamping the pressure plates into braking engagement with the disk 20. Since the sleeves 40 are free to slide axially with the bolt 48 loosened, the uprights 50 will find the exact center between the pressure plates in relation to the disk. The bolts 48 may then be tightened, and the correct relationship between the pressure plates and the disk is assured until subsequent disassembly and assembly requires realignment.

Means for applying braking force to the disk 20 through the plates 31 and 32 includes an actuator 60, FIG. 2, which is preferably a diaphragm air motor; however, it is within the scope of this invention to use a hydraulic actuator or any other type of actuator for this purpose. The actuator 60 includes a push rod 61 which is connected to apply a direct force to the inner pressure plate 31 through a clevice pin 63 supported on an integral extension 64 of the plate 31. As seen in FIGS. 2 and 3, this force applied by the actuator 60 to the plate 31 is well above the center line of the axle 12.

The rotational moment which would be applied by the actuator through this connection is equalized by the pivotal connection of a pair of brake actuating arms 70 and 71 which are connected to the actuator body 60 at one end thereof and each have opposite ends mounted for pivotal force applying movement at a point below the axis of the axle. The arrangement of the pair of actuating arms 70 and 71 can best be seen in FIGS. 1–3 as including upper ends which converge for connection directly to the actuator body by means of short stud bolts 72 which extend outwardly from the actuator body. The bolts 72 are received within the openings 73 formed in the arm ends and are retained by nuts 74. The openings 73 form a clearance fit with the stud bolts 72 and provide for limited self-aligning movement of the actuator 60 during the application of braking force. The arms 70 and 71 are connected to each other by means of a connecting rod or stabilizer bar 76, as shown in FIG. 1, which forms a pivotal connection with the arms and which is positioned radially outwardly of the keys on the torque member 25 so as to clear the member in assembly and disassembly.

The lower ends of the arms 70 and 71 are each drilled to accept a transverse pin 79 which pivotally supports a pair of thrust links 80 and 81, as shown in FIG. 7. The thrust links are formed substantially identical to each other and include cylindrical sockets or thrust surfaces 85 on their inner ends, as seen in FIGS. 8 and 9. The ends 85 are received in cup or U-shaped bosses 88 and 89 formed on the inner pressure plate 31. The thrust line 90 through the thrust links 80 and 81, FIG. 8, is below the axis of the axle 12. The proportionately greater force effected through the thrust links against the pressure plate 31 is balanced by the relatively lower force effected by the push rod 61 of the actuator 60 at the top of the plate 31 so that axial movement of this pressure plate is effected without moments tending to rotate it or bend it on the torque member.

Means connecting the arms 70 and 71 to the outer pressure plate to effect inward movement thereof upon the application of braking pressure through the actuator 60 includes a pair of draw bolts 95 and 96 which extend through the adjacent plate 31 and form a threaded connection with the outer plate 32, as shown in FIG. 6. The draw bolts 95 and 96 extend generally parallel to the axle 12 on the center line 98 of the brake, and are guided in the plate 31 for linear axial movement by a sleeve bushing 99. The draw bolts 95 and 96 are connected to the arms 70 and 71 respectively by a roller bushing 100 which has transversely extending pintles 101 and 102 received within a bifurcated yoke 105 formed on each of the arms.

The bushings 99 allow the draw bolts 95 and 96 to move only in an axial sense as defined by the center line 98 in FIGS. 8 and 9. Therefore, the arms 70 and 71 move outwardly along the line 98 upon the application of air pressure to the actuator 60, and pivot at the pin 79 and on the pintles of the bushing 100. This movement of the arms pulls the draw bolts and the outer pressure plate 32 into frictional engagement with the disk. At the same time, the inner pressure plate 31 is moved into frictional engagement by the combined axial forces of the push rod 61 and the thrust links 80 and 81, as described above. Upon release of air pressure, the retraction springs 55 and 56 establish the original air gap between the lining pads and the braking surfaces of the disk.

The links 80 and 81 are held into engagement with the sockets 85 by the retraction springs 55 and 56. However, an auxiliary spring 109 may be employed with each of the actuator arms to assure that the links remain in the seated positions, as shown, irrespective of vibration or other factors tending to dislodge the links.

As shown in FIG. 8, the thrust line 90 drawn from the center of the pintles 101 and 102 on the bushing 100 to the center of the contact point of the thrust links is not parallel to the center line 98. Instead, the thrust links are slanted upwardly in the released position of the brakes so that when the brake is actuated, as shown in FIG. 9, the links move to a more erected position as the arms move in a straight line at their connection with the draw bolts. The links 80 therefore form variable thrust connections between the lower ends of the arms 70 and 71 and the adjacent plate 31 which have the effect of decreasing the required stroke of the actuator 60 by increasing the effective stroke.

The invention includes positive and trouble free means for compensating for the wear of the friction pads and for adjusting the retraction gap. This includes the draw bolts 95 and 96 which are provided with a hexagonal head 110 having cross slots 111 formed therein to receive a wire retaining clip 115. The clip 115 is U-shaped and has inwardly turned ends which are received within suitable detent openings formed within the bushings 100. It is therefore easily removed by a pair of pliers, and the draw bolts 95 and 96 may be turned clockwise to decrease the distance between the opposite pressure plates 31 and 32 until the friction pads are in engagement with the sides of the disk. This may be done for each of the draw bolts, and then the bolts may be turned counterclockwise until the body of the clip 115 is in alignment with a transverse slot 111 whereupon the clip may be replaced securing the bolt in this adjusted position.

It is recognized that one of the draw bolts may be held by the clip in a slightly different adjusted position than the other thereby increasing or decreasing the amount of travel at one side of the brake unit as compared to the other. However, this does not adversely affect the operation of the unit since the openings 73 at the top of the arms provide for limited self-aligning movement of the actuator, and the stabilizer bar 76 also provides for limited independent and self-aligning movement during the application and the release of the brake.

The operation of this invention is largely self-evident from the foregoing description. The splined torque member 25 is preferably first assembled to the axle 12 at the flange 15 by the bolts 28. The two pressure plates and the actuator arms are readily assembled and held by the draw bolts 95 and 96, having first taken care to place the retraction springs 55 and 56 in place with regard to the positioning means or upright 50 on the sleeve 40 which will then hold the sleeve suspended therebetween. The assembled unit, consisting of the disk, the opposed pressure plates and the attached actuator arms, may be slid over the axle and onto the keys 30 of the torque member 25. To facilitate this without the disk slipping, it may be preferred to connect the actuator 60 to a suitable source of power, thereby clamping the plates together holding the disk in position while it is being assembled over the axle and over the torque member.

The disk 20 may then be connected to the wheel flange 16, and the clips 45 may be positioned and inserted with the tabs 43 threaded through the tongue slot 42, and the keeper bolts 48 loosely inserted. At this time, the actuator 60 is again operated to reapply the brakes affecting the centering of the positioning means 50 with respect to the center of the disk. While the brakes are thus applied, the bolts 48 are tightened, thereby assuring the correct positioning of the sleeves 40.

Adjustment of the clearance gap may be effected by adjustment of the draw bolts 95 and 96, as previously described. Removal of the brake from the axle is accomplished by reversing the above procedure. It may be noted that the disk 20 (with the wheel attached if desired) and pressure plates 31 and 32 may be removed as a unit merely by removing the bolts 48 and the clips 45, energizing the brake to hold the disk from slipping, and by sliding outwardly off of the torque member 25. If desired, the torque member may be removed at the same time by removing the bolts 28, which are usually directly accessible with the wheel in position through suitable openings in the wheel.

A disk brake constructed according to this invention is characterized by high braking efficiency in spite of the fact that it is not self-energizing, thereby providing a larger measure of control as against brakes which depend upon a self-energizing feature in order to achieve the desired braking torque. Thus, a brake may be constructed according to this invention with an 18-inch disk for use with a 10.00 x 20" tire or an 18,000–22,000-lb. axle to provide 10,000 ft./lbs. of stopping torque as a design parameter and to maintain this torque throughout the life of the lining. The invention is characterized by efficiency in that a smaller stroke of the actuator 60 is required for the application of full design torque as compared to the stroke required in a drum brake, and an example is ¾ of an inch stroke for the actuator 60 as compared to 1½ inches stroke for the actuator in a drum brake to achieve the same stopping torque.

The invention is further characterized by its simplicity and ruggedness of parts and by its adaptability to high volume production using standard production techniques and tolerances. The brake of this invention is further adapted for use under a wide variety of conditions, and contains few moving parts providing reliability.

A further embodiment of this invention is shown in FIG. 10 wherein rollers and cams take the place of the thrust links 80 and 81. A pair of rollers 120 correspond to the thrust links and are mounted on the pin 79 on opposite sides of each of the actuator arms in place of the links 80 and 81. Ramps or cams 122 are formed on the adjacent pressure plate 31 for coaction with the rollers. When the brake is applied, the movement of the actuator arms outwardly along the center line 98 causes the rollers 120 to move upwardly along their respective cam surfaces. The cam slope also causes the rollers 120 to move outwardly effectively decreasing the required stroke of the actuator 60 by increasing the movement at the draw bolts, such as described in connection with the thrust links.

Thus, the links 80 and 81 of FIGS. 2, 8 and 9 and the cams 122 and rollers 120 of FIG. 10 each provide variable thrust connection means pivotally connecting the lower ends of the actuator arms and the adjacent pressure plate for additional outward displacement of the pivot axis of the arms 70 and 71 at the draw bolts along the lines 98, decreasing the stroke which would otherwise be required of the actuator in any given application of the brake. It is understood that the position of the rollers and the cams may be interchanged, that is, the rollers may be mounted on the plate and the cams mounted on the arms, without departing from this invention.

As noted above, the disk 20 is preferably constructed according to the teachings of U.S. Patent No. 3,013,636. The spaced braking plates 130 and 131 are made of material, such as cast iron, having high resistance to wear. Aluminum or other material having good heat conducting qualities substantially fills the space between the spaced apart friction plates 130 and 131 and extends integrally therefrom forming a continuous, annular web 135 for heat conduction into a dissipating medium, such as air. The disk of this invention includes direct water vaporization cooling means in the form of an annular, inwardly opening, water-retaining groove or recess 136 cast or machined in the web 135. This recess is arranged to receive and retain cooling water from a pipe or nozzle 138 for retention therein, for flashing or vaporizing into steam.

In use, a measured quantity of water may be discharged into the recess 136 of the rotating disk 20 where centrifugal force will retain it within the recess. Water may be applied to the recess before or during periods of exceedingly heavy braking where supplementary cooling is desired. The heat absorbed from the disk by the flashing of the water into steam provides efficient cooling by reason of the high heat of vaporization of water as compared to systems which depend on heat conduction by water for cooling.

As an example, a disk brake including a disk constructed according to this invention operating on a dynamometer test stand may be operated through repeated two minute starting and stopping cycles and the disk may operate without water cooling at a stabilized temperature of 550 to 600° F., as measured between the plates 130 and 131. It has been found under such circumstances that the application of four ounces of water to the recess 136 for each two-minute cycle of operation vaporizes into steam and lowers the running temperature at the plates to a stabilized 300 to 350° F.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A disk brake for a wheel and axle comprising an annular disk adapted for connection to a wheel, a torque member positioned axially and centrally of said disk and adapted to be fixed to a non-rotating axle member, a pair of pressure plates one each positioned on each side of said disk, means mounting said plates on said torque member for axial movement into engagement with said disk at the opposite sides thereof, operator means for effecting said axial movement of said plates to apply said brake, independent retraction means for each said plate carried on said torque member and arranged to apply retraction forces to said plates to effect release of said brake upon the release of said operator means, and means for adjusting the position of said retraction means on said member in relation to the center of said disk to retract said plates equally from each side of said disk.

2. A disk brake for a rotating wheel and fixed axle assembly, comprising an annular disk adapted to be connected for rotation to such wheel, a torque member positioned axially of said disk and adapted to be fixed to such axle, a pair of pressure plates one each positioned on each side of said disk, means mounting said plates on said torque member for axial movement into engagement with said disk at the opposite sides thereof, an actuator having a connection to one of said pressure plates at a point above the axis of the axle, arm means having one end connected to said actuator and having an opposite end thereof mounted for pivotal movement at a point below said axis, and draw bolt means extending through said one pressure plate in a plan including said axis connecting the opposite said plate for axial movement with said arm means into engagement with said disk.

3. The disk brake of claim 2 wherein said draw bolt means forms a threaded connection with said opposite plate and is adjustable by rotation thereof to adjust the running clearance between said pressure plates and said disk.

4. A disk brake for a rotating wheel and fixed axle assembly, comprising an annular disk adapted to be connected for rotation to said wheel, a pair of pressure plates one each positioned on each side of said disk, means mounting said plates for axial movement into engagement with said disk at the opposite sides thereof, an actuator having an operating connection to the adjacent one of said pressure plates at a point above the axis of rotation, arm means having one end connected to said actuator for operation thereby and having an opposite end thereof extending below said axis, draw bolt means having a pivotal connection to said arm means and extending from a position adjacent an outer surface of said one pressure plate and forming a connection with the opposite said plate for effecting axial movement of said opposite plate by said arm means into engagement with said disk, and means pivotally connecting said arm means at said opposite end with said one pressure plate for outwardly displacing the said pivotal connection at said draw bolt means during a stroke of said actuator effectively decreasing said stroke thereof.

5. A disk brake for a rotating wheel and fixed axle assembly, comprising an annular disk adapted to be connected for rotation to said wheel, a pair of pressure plates one each positioned on each side of said disk, means mounting said plates for axial movement into engagement with said disk at the opposite sides thereof, an actuator having an operating connection to one of said pressure plates at a point on one side of the axis of rotation, arm means having one end connected to said actuator for operation thereby and having an opposite end thereof extending below said axis, link means pivotally connecting said opposite end and said one plate and arranged for erecting movement upon the operation of said actuator providing a decrease in the required actuator stroke to effect a given plate movement, and draw bolt means extending from a position adjacent an outer surface of said one pressure plate and forming a connection with the opposite said plate for effecting axial movement of said opposite plate by said arm means into engagement with said disk.

6. A disk brake for a rotating wheel and fixed axle assembly, comprising an annular disk adapted to be connected for rotation to such wheel, a torque member positioned axially of said disk and adapted to be fixed to such axle, a pair of pressure plates one each positioned on each side of said disk, means mounting said plates on said torque member for axial movement into engagement with said disk at the opposite sides thereof, an actuator having a connection to one of said pressure plates at a point above the axis of the axle, a pair of actuator arms each having one end connected to said actuator and having an opposite end thereof extending below said axis, said arms including draw bolts extending from a position adjacent an outer surface of said one pressure plate in a plane including said axis and forming a connection with the opposite said plate for effecting axial movement of said opposite plate by said arm means into engagement with said disk, means guiding said draw bolts for axial movement only, inclined thrust links pivotally connected to said lower arms with their inner ends in contact with said one plate and arranged for erecting movement with the axial movement of said draw bolts to shorten the stroke required of said actuator.

7. A disk brake for a rotating wheel and fixed axle assembly, comprising an annular disk adapted to be connected for rotation to said wheel, a pair of pressure plates one each positioned on each side of said disk, means mounting said plates for axial movement into engagement with said disk at the opposite sides thereof, an actuator having an operating connection to one of said pressure plates at a point above the axis of rotation, a pair of arms having one end connected to said actuator for operation thereby and having opposite ends thereof extending below said axis on opposite sides thereof, a pair of draw bolts one pivotally connected to each of said arms substantially in a plane including said axis and extending from a position adjacent an outer surface of said one pressure plate and forming a connection with the opposite said plate for effecting axial movement of said opposite plate by said arms into engagement with said disk, and cooperating cams and rollers connecting each of said arms to said one pressure plate at said opposite ends arranged to displace outwardly the pivot point of said arms and draw bolts with the stroke of said actuator effectively decreasing the said stroke with a given application of said brake.

8. In a plate-type disk brake having a disk and a pair of opposed brake pad supporting plates received on opposite sides of said disk, the improvement comprising means mounting each of said plates for generally axial movement toward and away from said disk, a pair of draw bolts extending through one of said plates and forming a connection to the other of said plates, means guiding said bolts in said one plate for generally axial movement therethrough with axial movement of said other plate on said mounting means, a pair of operator arms, means pivotally connecting each of said operator arms intermediate the ends thereof at one of said draw bolts, brake applying motor means connected to said arms at one end thereof and to said one plate for applying a force to said arms and a reaction force to said plate, and means on each of said arms forming a variable thrust connection between the other end of each of said arms and said one plate.

9. The brake of claim 8 wherein said draw bolts lie in a plane including the axis of rotation of said disk, and the said opposite ends of each of said arms lie respectively on opposite sides of said plane.

10. The disk brake of claim 8 wherein said draw bolts are formed with a threaded connection to said other plate and are rotatable to adjust the running clearance between said plates and said disk.

11. The brake of claim 8 wherein each of said thrust connection means includes a link which is normally inclined to the axis of said disk and which moves during an operating stroke of said brake applying motor means to a more nearly erect position along a line more nearly parallel to the axis of said disk.

12. The brake of claim 8 wherein said thrust connections comprises an inclined cam surface formed on said one plate and cam follower means on said other arm ends in engagement with said cam surface providing axial outward movement of said arms along said cams during an operating stroke of said brake applying motor means.

13. In a plate-type disk brake having a disk and a pair of opposed brake pad supporting plates received on opposite sides of said disk, the improvement comprising a torque-receiving spider, means mounting each of said plates for generally axial movement on said spider toward and away from said disk and supporting said plates against rotational torque imparted by said disk, a pair of draw bolts extending through one of said plates and forming a connection with the other of said plates and each lying generally in a plane which includes the axis of rotation of said disk, a pair of operator arms positioned adjacent an outer surface of said one plate, means pivotally connecting each of said operator arms intermediate the ends thereof at one of said draw bolts, brake applying motor means having means forming a common drive connection to each of said arms spaced from said plane at one side thereof and having a connection to said one plate for applying a force to said arms and a reaction force to said plate, and separate means on each of said arms spaced from the other side of said plane forming pivotal thrust connections between each of said arms and said one plate.

References Cited by the Examiner
UNITED STATES PATENTS

| | | | |
|---|---|---|---|
| 851,956 | 4/1907 | McMahon | 192—68 |
| 1,694,980 | 12/1928 | Pearmain | 192—68 |
| 1,972,353 | 9/1934 | North et al. | 188—72 |
| 2,098,490 | 11/1937 | Fitzpatrick et al. | 188—264.2 |
| 2,263,961 | 11/1941 | Wilson | 188—264.2 |
| 2,349,928 | 5/1944 | Ash | 188—72 |
| 2,371,158 | 3/1945 | Eby | 188—72 |
| 2,586,518 | 2/1952 | Collier | 188—72 |

References Cited by the Applicant
UNITED STATES PATENTS

| | | |
|---|---|---|
| 3,077,246 | 2/1963 | Redmayne et al. |

FOREIGN PATENTS

| | | |
|---|---|---|
| 983,328 | 6/1951 | France |

ARTHUR L. LA POINT, *Primary Examiner.*
EUGENE G. BOTZ, *Examiner.*